(12) United States Patent
Im et al.

(10) Patent No.: US 11,106,899 B2
(45) Date of Patent: Aug. 31, 2021

(54) ELECTRONIC DEVICE, AVATAR FACIAL EXPRESSION SYSTEM AND CONTROLLING METHOD THEREOF

(71) Applicant: INDUSTRY UNIVERSITY COOPERATION FOUNDATION HANYANG UNIVERSITY, Seoul (KR)

(72) Inventors: Chang-Hwan Im, Seoul (KR); Ho-Seung Cha, Seoul (KR); Seongjun Choi, Seoul (KR)

(73) Assignee: INDUSTRY UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 72 days.

(21) Appl. No.: 16/534,579

(22) Filed: Aug. 7, 2019

(65) Prior Publication Data
US 2020/0327312 A1 Oct. 15, 2020

(30) Foreign Application Priority Data

Apr. 10, 2019 (KR) ........................ 10-2019-0041847

(51) Int. Cl.
*G06K 9/00* (2006.01)
*G06F 3/01* (2006.01)
*G06T 13/40* (2011.01)

(52) U.S. Cl.
CPC ......... *G06K 9/00302* (2013.01); *G06F 3/015* (2013.01); *G06K 9/00255* (2013.01);
(Continued)

(58) Field of Classification Search
CPC ........... G06K 9/00302; G06K 9/00281; G06K 9/00275; G06K 9/00255; G06K 9/627; G06F 3/015; G06T 13/40
See application file for complete search history.

(56) References Cited

U.S. PATENT DOCUMENTS 9,521,202 B2    12/2016   Hwang
10,210,648 B2*   2/2019   Stoyles .............. G06K 9/00228
(Continued)

FOREIGN PATENT DOCUMENTS

JP     2003058908 A    2/2003
JP        5574407 B2    8/2014
(Continued)

OTHER PUBLICATIONS

Korean Office Action issued KR Application No. 10-2019-0041847 filed on Apr. 10, 2019 on behalf of Hanyang University Industrial and Academic Cooperation Center, dated Feb. 26, 2020. 17 Pages.
(Continued)

*Primary Examiner* — Christopher M Brandt
(74) *Attorney, Agent, or Firm* — Steinfl + Bruno, LLP

(57) ABSTRACT

An electronic device, an avatar facial expression system, and a controlling method thereof are provided. The electronic device includes a sensor part that is attached in the facial part of a user and detects a facial electromyography signal according to a facial expression, a processor that extracts a feature based on the facial electromyography signal and determines a data value of an avatar's facial movement corresponding to the extracted feature, and a display that controls a facial movement of the avatar based on the data value of the avatar's facial movement and displays a facial expression of the avatar corresponding to the facial expression of the user.

12 Claims, 12 Drawing Sheets

(52) U.S. Cl.
CPC ..... *G06K 9/00275* (2013.01); *G06K 9/00281* (2013.01); *G06T 13/40* (2013.01)

(56) References Cited

U.S. PATENT DOCUMENTS

| | | | |
|---|---|---|---|
| 2006/0071934 | A1 | 4/2006 | Sagar et al. |
| 2013/0002669 | A1* | 1/2013 | Rhee ........................ G06T 13/40 345/420 |
| 2015/0334189 | A1 | 11/2015 | Hwang |
| 2016/0089041 | A1* | 3/2016 | Keat ................... A61B 5/02416 600/479 |
| 2017/0256086 | A1* | 9/2017 | Park .......................... G06T 7/73 |
| 2018/0240261 | A1* | 8/2018 | Tadi ................... G06K 9/00302 |
| 2018/0247443 | A1* | 8/2018 | Briggs ............... G06K 9/00302 |
| 2019/0138096 | A1* | 5/2019 | Lee .................... G06K 9/00302 |
| 2019/0354174 | A1* | 11/2019 | Young ................... G09G 5/393 |
| 2019/0361519 | A1* | 11/2019 | Lee .......................... G06F 3/011 |
| 2019/0369726 | A1* | 12/2019 | Kang ........................ G06F 3/011 |
| 2020/0005138 | A1* | 1/2020 | Wedig ....................... G06N 3/08 |
| 2020/0065569 | A1* | 2/2020 | Nduka ................... G06K 9/209 |
| 2020/0090392 | A1* | 3/2020 | Chou ...................... G06F 3/012 |

FOREIGN PATENT DOCUMENTS

| | | |
|---|---|---|
| KR | 20070057997 A | 6/2007 |
| KR | 100917486 B1 | 9/2009 |
| KR | 20150077571 A | 7/2015 |
| KR | 20170018107 A | 2/2017 |
| KR | 20180056231 A | 5/2018 |
| WO | 2006/039497 A2 | 4/2006 |
| WO | 2017006872 A1 | 4/2018 |

OTHER PUBLICATIONS

Korean Office Action for KR Application No. 10-2019-0041847 filed on Apr. 10, 2019 on behalf of Industry-University Cooperation Foundation Hanyang University, dated Aug. 4, 2020 17 pages (English + Original).

Notice of Preliminary Rejection for KR Application No. 10-2019-0041847 filed on Apr. 10, 2019 on behalf of Hanyang University Industrial and Academic Cooperation Center, dated Oct. 23, 2020. KR original + English Trans. 18 pages.

* cited by examiner

FIRST FACIAL    SECOND FACIAL
EXPRESSION      EXPRESSION

FIG. 7C

| | NUMBER OF TRIALS | GROUP NO. |
|---|---|---|
| NTH USER | 1 | 1 |
| | 2 | 3 |
| | 3 | 2 |
| | 4 | 1 |
| | ... | ... |
| | 20 | |
| | GROUP NO. IN THE LARGEST NUMBER | 1 |

ELECTRONIC DEVICE, AVATAR FACIAL EXPRESSION SYSTEM AND CONTROLLING METHOD THEREOF

CROSS-REFERENCE TO RELATED APPLICATION(S)

This application is based on and claims priority under 35 U.S.C. § 119(a) of a Korean patent application number 10-2019-0041847, filed on Apr. 10, 2019, in the Korean Intellectual Property Office, the disclosure of which is incorporated by reference herein in its entirety.

BACKGROUND

1. Field

The disclosure relates to an electronic device, an avatar facial expression system, and a controlling method thereof, and more particularly, to an electronic device which displays a facial expression of an avatar matched with a facial expression of a user, an avatar facial expression system, and a controlling method thereof.

2. Description of Related Art

Recently, interactive VR applications utilizing avatars are being developed, and accordingly, there is a demand for a technology of identifying facial movements and expressions of a user in a head-mounted display (HMD) environment.

In the conventional technology, for restoring facial movements and expressions of a user, a method of photographing facial appearances using a camera and restoring facial expressions was mainly used. However, in a state of wearing an HMD, a user's face is covered by the HMD, and thus there is a limit in the conventional facial expression restoring technology using a camera. For overcoming the aforementioned problem, a technology of recognizing a facial expression of a user by attaching a camera to an HMD, and expressing the facial expression on an avatar was developed. However, such a technology of using a camera has problems that it is hard to be applied in an environment wherein a user's face is covered by an HMD, and is influenced a lot by the angle of the camera, the ambient light, etc.

In this regard, a technology of additionally attaching a pressure sensor other than a camera was developed, but the technology has problems that it is not ergonomic, and does not have a high recognition rate, and a lot of time for correction is required.

Meanwhile, a research on recognizing a facial expression by using a facial electromyography (fEMG) signal generated from facial muscles when wearing an HMD proceeded. However, the conventional technology of recognizing a facial expression by using fEMG is not a technology of restoring a natural facial movement of a user, but a technology of choosing one among some predetermined facial expressions, and has a problem that it is not sufficient for expressing various and natural facial movements of a user.

Accordingly, there is a need for a technology of displaying facial expressions of an avatar that are matched with facial expressions of a user and display natural facial expressions.

SUMMARY

The disclosure is for overcoming the aforementioned problems, and the purpose of the disclosure is in providing an electronic device that recognizes a natural facial muscle movement of a user and restores the recognized facial muscle movement on an avatar and displays a natural facial expression of the avatar, an avatar facial expression system, and a controlling method thereof.

According to an embodiment of the disclosure for achieving the aforementioned purpose, an electronic device may include a sensor part that is attached in the facial part of a user and detects a facial electromyography signal according to a facial expression, a processor that extracts a feature based on the facial electromyography signal and determines a data value of an avatar's facial movement corresponding to the extracted feature, and a display that controls a facial movement of the avatar based on the data value of the avatar's facial movement and displays a facial expression of the avatar corresponding to the facial expression of the user. The processor may partition features corresponding to predetermined facial expression data into a plurality of groups based on similarity, and determine a data value of the avatar's facial movement based on a learning model having the highest similarity to a feature corresponding to the user's predetermined facial expression among a plurality of learning models trained with respect to each of the plurality of partitioned groups.

Meanwhile, in the sensor part, a plurality of sensors may be arranged as a sensor set in each of the upper and lower portions of the left eye of the user, and a plurality of sensors may be arranged as a sensor set in each of the upper and lower portions of the right eye of the user.

Also, the processor may acquire a difference among a plurality of signals detected at the plurality of sensors included in each of the sensor sets as a facial electromyography signal of each of the sensor sets.

In addition, the processor may filter the facial electromyography signal based on a band pass filter in a band of 20 Hz to 450 Hz.

Further, the processor may extract the feature while moving a window in a predetermined size at a predetermined time interval in the facial electromyography signal.

Meanwhile, the feature may include at least one of a root mean square (RMS), a cepstral coefficient (CC), sample entropy (SE), or a length of a signal (WL).

Also, the processor may calculate the distance between a center value of a group including a feature corresponding to predetermined facial expression data included in each of the plurality of learning models and a feature corresponding to the user's predetermined facial expression, and determine a learning model including a group for which the calculated distance is the closest as the learning model having the highest similarity.

Meanwhile, according to an embodiment of the disclosure for achieving the aforementioned purpose, a controlling method of an electronic device may include the steps of detecting by a sensor part that is attached in the facial part of a user a facial electromyography signal according to a facial expression, extracting a feature based on the facial electromyography signal, determining a data value of an avatar's facial movement corresponding to the extracted feature, and controlling a facial movement of the avatar based on the data value of the avatar's facial movement and displaying a facial expression of the avatar corresponding to the facial expression of the user. Also, in the step of determining a data value of a facial movement, features corresponding to predetermined facial expression data may be partitioned into a plurality of groups based on similarity, and a data value of the avatar's facial movement may be determined based on a learning model having the highest similarity to a feature corresponding to the user's predetermined facial expression among a plurality of learning models trained with respect to each of the plurality of partitioned groups.

In addition, the sensor part may include a plurality of sensor sets including a plurality of sensors, and the controlling method of an electronic device may further include the step of acquiring a difference among a plurality of signals detected at the plurality of sensors included in each of the sensor sets as a facial electromyography signal of each of the sensor sets.

Also, the controlling method of an electronic device may further include the step of filtering the facial electromyography signal based on a band pass filter in a band of 20 Hz to 450 Hz.

Meanwhile, in the step of extracting a feature, the feature may be extracted while moving a window in a predetermined size at a predetermined time interval in the facial electromyography signal.

Meanwhile, the feature may include at least one of a root mean square (RMS), a cepstral coefficient (CC), sample entropy (SE), or a length of a signal (WL).

Also, in the step of determining a data value of a facial movement, the distance between a center value of a group including a feature corresponding to predetermined facial expression data included in each of the plurality of learning models and a feature corresponding to the user's predetermined facial expression may be calculated, and a learning model including a group for which the calculated distance is the closest may be determined as the learning model having the highest similarity.

Meanwhile, according to an embodiment of the disclosure for achieving the aforementioned purpose, an avatar facial expression system may include a sensor device that is attached in the facial part of a user and detects a facial electromyography signal according to a facial expression, and transmits the detected facial electromyography signal to a server, a server that extracts a feature based on the received facial electromyography signal, determines a data value of an avatar's facial movement corresponding to the extracted feature, and transmits the determined data value of an avatar's facial movement to a terminal device, and a terminal device that controls a facial movement of the avatar based on the received data value of the avatar's facial movement and displays a facial expression of the avatar corresponding to the facial expression of the user. Also, the server may partition features corresponding to predetermined facial expression data into a plurality of groups based on similarity, and determine a data value of the avatar's facial movement based on a learning model having the highest similarity to a feature corresponding to the user's predetermined facial expression among a plurality of learning models trained with respect to each of the plurality of partitioned groups.

As described above, according to various embodiments of the disclosure, an electronic device, an avatar facial expression system, and a controlling method thereof may recognize a facial muscle movement of a user and display a natural facial expression of an avatar matched with the facial expression of the user.

Also, an electronic device, an avatar facial expression system, and a controlling method thereof may enhance a face restoration recognition rate by displaying a facial expression of an avatar by using a learning model having the highest similarity to a detected facial electromyography signal of a user.

Meanwhile, the effects of the disclosure are not limited to the effects mentioned above, and other effects that were not mentioned would be clearly understood by those skilled in the art from the following descriptions.

BRIEF DESCRIPTION OF THE DRAWINGS

FIG. 7C is a diagram illustrating a process of selecting a learning model having high similarity to a facial electromyography signal according to an embodiment of the disclosure;

DETAILED DESCRIPTION

Figure 1:
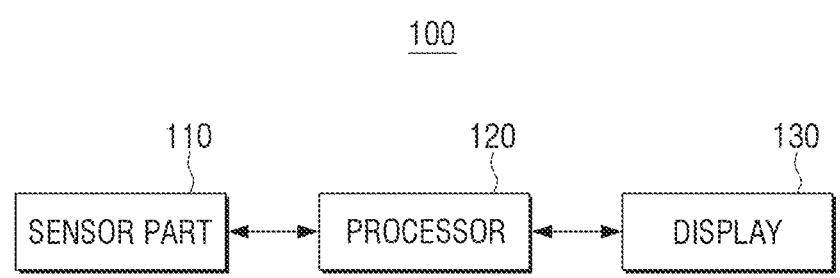
FIG. 1 is a block diagram of an electronic device according to an embodiment of the disclosure.

Hereinafter, various embodiments will be described in more detail with reference to the accompanying drawings. The embodiments described in this specification may be modified in various forms. Specific embodiments may be illustrated in the drawings, and explained in detail in the detailed description. However, the specific embodiments described in the accompanying drawings are just for making the various embodiments understood easily. Therefore, the technical idea of the disclosure is not limited by the specific embodiments described in the accompanying drawings, but they should be interpreted to include all equivalents or alternatives included in the ideas and the technical scopes disclosed herein.

Terms including ordinal numbers such as 'the first' and 'the second' may be used to describe various elements, but these elements are not limited by the aforementioned terms. The aforementioned terms are used only for the purpose of distinguishing one element from another element.

In this specification, terms such as "include" and "have/has" should be construed as designating that there are such characteristics, numbers, steps, operations, elements, components or a combination thereof described in the specification, but not to exclude in advance the existence or possibility of adding one or more of other characteristics, numbers, steps, operations, elements, components or a combination thereof. Also, the description in the disclosure that an element is "coupled with/to" or "connected to" another element should be interpreted to mean that the one element may be directly coupled with/to or connected to the another element, but still another element may exist between the elements. In contrast, the description that one element is "directly coupled" or "directly connected" to another element should be interpreted to mean that still another element does not exist between the one element and the another element.

Meanwhile, "a module" or "a part" for elements used in this specification performs at least one function or operation. Also, "a module" or "a part" may perform a function or an operation by hardware, software, or a combination of hardware and software. Also, a plurality of "modules" or a plurality of "parts" excluding "a module" or "a part" that needs to be performed in specific hardware or is performed in at least one processor may be integrated into at least one module. Further, singular expressions may include plural expressions, unless defined obviously differently in the context.

In the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

In the process of transmitting information (data) performed in this specification, encryption/decryption may be applied depending on needs, and in this specification and the claims, all expressions describing the process of transmitting information (data) should be interpreted to include cases of encryption/decryption, even if there is no separate mention in that regard. Also, in this specification, expressions such as "transmit (transfer) from A to B" and "A receives from B" include a case wherein transmission (transfer) or receipt is performed while another medium is included in between, and do not necessarily mean that an object is directly transmitted (transferred) or received from A to B.

In addition, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

Further, in describing the disclosure, in case it is determined that detailed explanation of related known functions or features may unnecessarily confuse the gist of the disclosure, the detailed explanation will be omitted. Meanwhile, each embodiment of the disclosure may be independently implemented or operated, but it may also be implemented or operated in combination with another embodiment.

FIG. 1 is a block diagram of an electronic device according to an embodiment of the disclosure.

Referring to FIG. 1, an electronic device 100 may include a sensor part 110, a processor 120, and a display 130.

The sensor part 110 may be attached in the facial part of a user and detect a facial electromyography (fEMG) signal according to a facial expression. The sensor part 110 may include a plurality of sensors, and the plurality of sensors may be arranged while adhering to the facial part of a user. Also, in the plurality of sensors, sensors in a predetermined number may be arranged while being adjacent to one another. Detailed arraignment of the sensors will be described later. The plurality of sensors arranged while adhering to the facial part may detect a facial electromyography signal according to a change of the user's facial expression.

The processor 120 may detect a feature based on the detected facial electromyography signal, and determine a data value of an avatar's facial movement corresponding to the extracted feature. The processor 120 may filter the facial electromyography signal for extracting only a signal having an electromyography property from the detected facial electromyography signal. For example, filtering may be performed by using a band pass filter allowing passage of a band of 20 Hz to 450 Hz.

In addition, the processor 120 may extract a feature while moving a window in a predetermined size at a predetermined time interval in the detected facial electromyography signal during a predetermined time period. For example, an extracted feature may include a root mean square (RMS), a cepstral coefficient (CC), sample entropy (SE), or a length of a signal (WL). Then, the processor 120 may determine a data value of an avatar's facial movement corresponding to the extracted feature based on a learning model trained with deep learning.

Meanwhile, when determining a data value of an avatar's facial movement, the processor 120 may not make determination based on one learning model, but determine a data value of an avatar's facial movement by selecting a learning model having the highest similarity to the feature of the facial electromyography signal of the user among a plurality of learning models. As an example, in the process of learning, the processor 120 may partition features corresponding to predetermined facial expression data of a plurality of users to be learned into a plurality of groups based on similarity. Then, the processor 120 may generate a plurality of learning models trained with respect to each of the plurality of partitioned groups. In the process of execution, the processor 120 may extract a feature corresponding to predetermined facial expression data of a user, and identify a learning model having the highest similarity to the extracted feature. Then, the processor 120 may extract a facial electromyography signal according to the user's facial expression, extract a feature from the extracted facial electromyography signal, and determine a data value of an avatar's facial movement corresponding to the extracted feature based on the identified learning model. Further, the processor 120 may apply the determined data value of an avatar's facial movement to the avatar. A detailed process wherein the processor 120 extracts a feature and determines a data value of an avatar's facial movement will be described later.

The display 130 may control the avatar's facial movement based on the determined data value of the avatar's facial movement. That is, the display 130 may display the avatar's facial expression corresponding to the user's facial expression.

Figure 2:
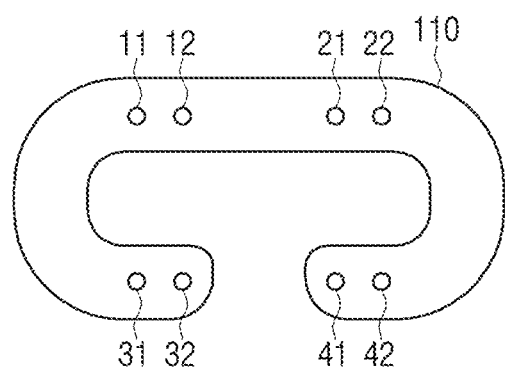
FIG. 2 is a diagram illustrating a location wherein a sensor is arranged according to an embodiment of the disclosure.

FIG. 2 is a diagram illustrating a location wherein a sensor is arranged according to an embodiment of the disclosure.

Referring to FIG. 2, a sensor part 110 including a plurality of sensors 11, 12, 21, 22, 31, 32, 41, 42 are illustrated on a surface contacting a facial part of a user. In the plurality of sensors 11, 12, 21, 22, 31, 32, 41, 42, at least two sensors may be arranged as a sensor set while being adjacent to each other. As an example, referring to FIG. 2, a first sensor 11 and a second sensor 12 may be implemented as a first sensor set, a third sensor 21 and a fourth sensor 22 as a second sensor set, a fifth sensor 31 and a sixth sensor 32 as a third sensor set, and a seventh sensor 41 and an eighth sensor 82 as a fourth sensor set. Also, each sensor set may be arranged in the upper and lower portions of the left eye of the user, and in the upper and lower portions of the right eye of the user. However, the arrangement and the number of sensors illustrated in FIG. 2 is just an example, and sensor sets including a plurality of sensors may be additionally arranged.

Each of the plurality of sensors 11, 12, 21, 22, 31, 32, 41, 42 may detect a facial electromyography signal based on the user's facial muscle movement. Also, the electronic device may acquire a difference among detected signals detected at a plurality of sensors included in a sensor set as a facial electromyography signal of the sensor set. For example, the electronic device may acquire a difference signal between a first sensor detected signal and a second sensor detected signal included in a first sensor set as a signal of the first sensor set. By the aforementioned method, the electronic device may acquire signals of the second sensor set to the fourth sensor set. A facial electromyography signal detected at each sensor may include various noises. In the case of acquiring a difference between two adjacent sensor signals as a facial electromyography signal, a common noise that is applied to two electrodes (or, sensors) simultaneously is removed, and thus a signal strong against noises may be acquired. Through the aforementioned process, the electronic device may extract a feature based on a facial electromyography signal acquired from each sensor set. Then, the electronic device may determine a data value of an avatar's facial movement based on the extracted feature and a learning model based on deep learning.

Hereinafter, a process of generating a learning model based on deep learning will be described.

Figure 3:
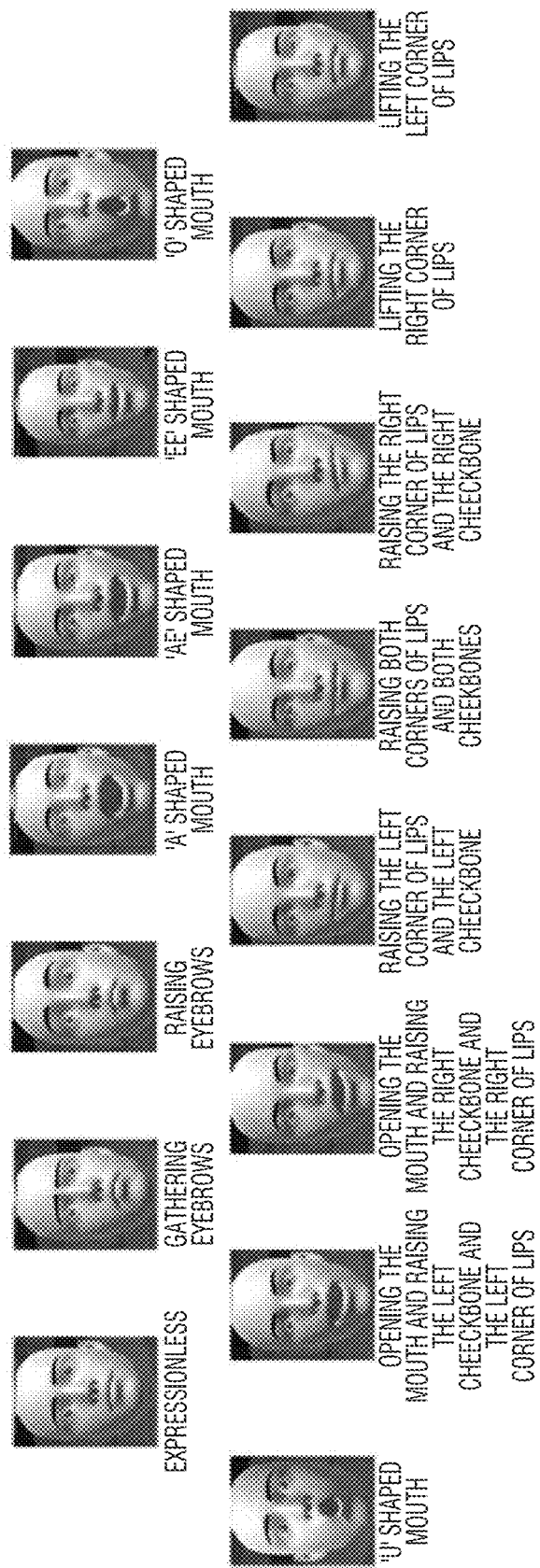
FIG. 3 is a diagram illustrating pictures of facial expressions according to an embodiment of the disclosure.

FIG. 3 is a diagram illustrating pictures of facial expressions according to an embodiment of the disclosure.

Referring to FIG. 3, an example of various facial expressions or facial muscle movements is illustrated. The electronic device may acquire facial electromyography signals according to predetermined various facial expressions with respect to each of a plurality of users, for generating a learning model based on deep learning. As an example, in the disclosure, the pictures for stimulating facial expressions illustrated in FIG. 3 were randomly shown to ten participants, and the participants were instructed to imitate the facial expressions, and a facial electromyography signal and data of an avatar's facial movement for each participant were simultaneously acquired. Then, the electronic device constructed 20 sets of databases for each participant with 15 expressions as one set, and generated a learning model based on the acquired facial electromyography signals and data of avatars' facial movements. However, the facial expressions, the number of participants, and the number of data sets per participant described in FIG. 3 are just an example, and they may be set in various ways for generating an appropriate learning model.

Figure 4:
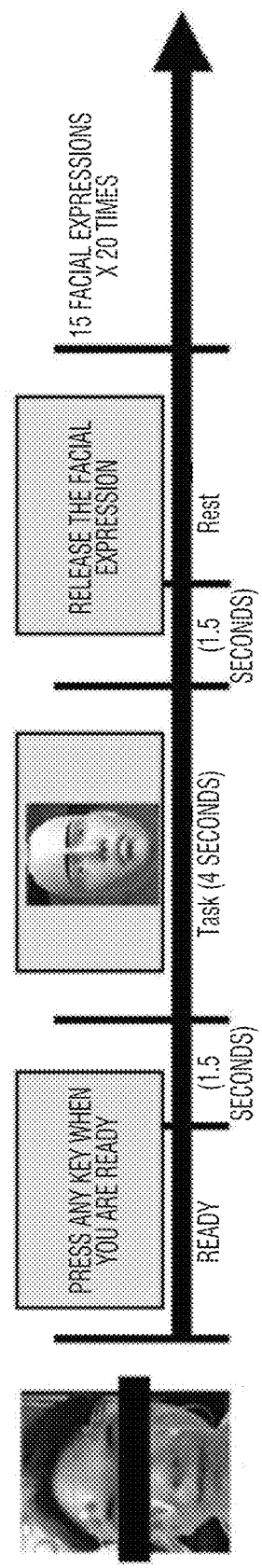
FIG. 4 is a diagram illustrating a process of measuring a facial electromyography signal of a user according to an embodiment of the disclosure.

FIG. 4 is a diagram illustrating a process of measuring a facial electromyography signal of a user according to an embodiment of the disclosure.

As illustrated in FIG. 4, a sensor part wherein a plurality of sensor sets including a plurality of sensors are arranged may be arranged to adhere to a facial part of a participant. Then, the electronic device may perform a ready step guiding the participant to push the start button. For example, the electronic device may guide to push the start button with a text through a display. Alternatively, the electronic device may guide to push the start button with a voice by including a speaker. Or, the electronic device may guide simultaneously through a display and a speaker.

When the participant pushes the start button, on the electronic device, one facial expression among 15 facial expressions may be selected randomly and displayed through a display, and the participant may put on a facial expression according to the suggested specific facial expression for four seconds. The electronic device may guide a break time for facial expressions after four seconds, and perform a reset step. In a similar manner to the above, the electronic device may guide a break time for facial expressions through at least one of a display or a speaker. The electronic device may set putting on each of 15 facial expressions once as a set, and repeat the set for 20 times, and generate a database for learning based on deep learning. Also, the electronic device may repeat the same process for another participant, and generate a database for learning based on deep learning.

The electronic device may extract a feature from data for seven seconds (or, a facial electromyography signal) for each facial expression of a participant. That is, the electronic device may extract a feature from data for four seconds wherein a participant puts on a facial expression, and data for 1.5 seconds in a ready step and a reset step which are before and after the aforementioned data of four seconds. In general, there could be a muscle that moves in advance for a person to put on a specific facial expression, and there could be a muscle that moves till the end after a person puts on a facial expression. Accordingly, the electronic device may predict a user's facial expression more precisely by extracting a feature from data of a time period (four seconds) in a task step of putting on a facial expression and a time period (1.5 seconds) of a precedent step and a subsequent step. However, the aforementioned seven seconds which is a time period for acquiring data for extracting a feature is just an example, and the time period may be set variously.

The electronic device may extract a feature while moving a window in a predetermined size at a predetermined time interval in the acquired data.

Figure 5:
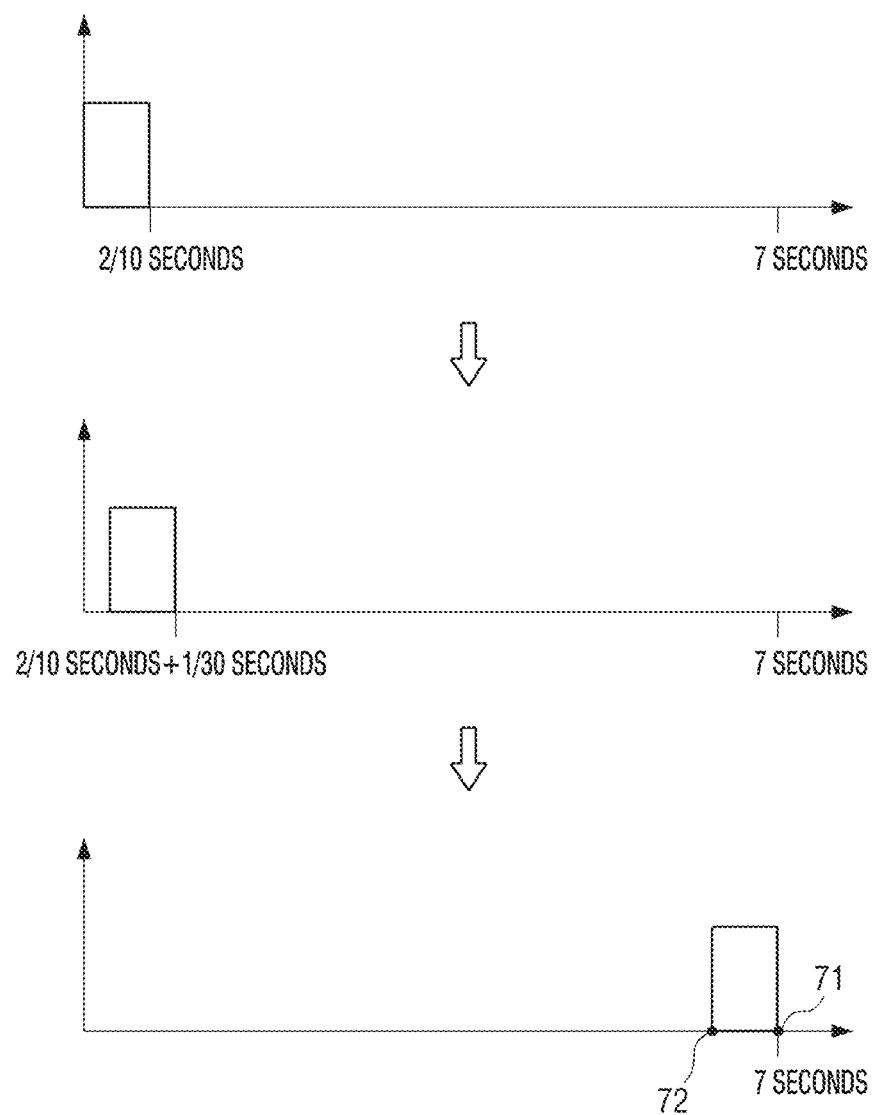
FIG. 5 is a diagram illustrating a process of extracting a feature according to an embodiment of the disclosure.

FIG. 5 is a diagram illustrating a process of extracting a feature according to an embodiment of the disclosure.

In general, electromyography may be analyzed in a time area and a frequency area. In the disclosure, a method of electromyography analysis was used in a time area for real time processing, and analysis was performed by extracting features such as a root mean square (RMS), a cepstral coefficient (CC), sample entropy (SE), or a length of a signal (WL).

As illustrated in FIG. 5, for example, the electronic device may extract the aforementioned features from a section corresponding to a window of $2/10$ (0.2) seconds in data (or, a facial electromyography signal) for seven seconds. Then, the electronic device may move the window of $2/10$ seconds by $1/30$ seconds, and extract features from the section to which the window moved. The electronic device may repeat the aforementioned process and extract features from each section (or, each window) until a preceding point 71 of the window of $2/10$ seconds reaches the point of seven seconds. Alternatively, the electronic device may extract features from each section (or, each window) until a subsequent point 72 of the window of ²⁄₁₀ seconds reaches the point of seven seconds.

As an example, in case a signal is detected at a sensor part illustrated in FIG. 2, four channel signals may be acquired from the first to fourth sensor sets. Then, seven features in total may be extracted, as one root mean square feature, four cepstral coefficient features, one sample entropy (SE) feature, and one length of a signal feature. Accordingly, the electronic device may extract 28 features in total per window (four channels×seven features). The cepstral coefficient features may be calculated for each order of an input signal. For example, in case cepstral coefficient features are calculated with respect to the first coefficient to the fourth coefficient, four cepstral coefficient features may be acquired.

In case windows are moved until the preceding points 71 of the windows reach the point of seven seconds, the preceding point 71 of the first window becomes ²⁄₁₀ seconds, the preceding point 71 of the second window that moved as much as ¹⁄₃₀ seconds becomes (²⁄₁₀+¹⁄₃₀) seconds, and the preceding point 71 of the third window that moved further as much as ¹⁄₃₀ seconds becomes (²⁄₁₀+¹⁄₃₀+¹⁄₃₀) seconds. Thus, the number of windows until the preceding points 71 of the windows reach the point of seven seconds is 205. Accordingly, the electronic device may acquire 205 data including 28 features.

In case windows are moved until the subsequent points 72 of the windows reach the point of seven seconds, the subsequent point 72 of the first window becomes 0 second, the subsequent point 72 of the second window that moved as much as ¹⁄₃₀ seconds becomes ¹⁄₃₀ seconds, and the subsequent point 72 of the third window that moved further as much as ¹⁄₃₀ seconds becomes (¹⁄₃₀+¹⁄₃₀) seconds. Thus, the number of windows until the subsequent points 72 of the windows reach the point of seven seconds is 211. Accordingly, the electronic device may acquire 211 data including 28 features. Then, the electronic device may slide sequences consisting of 30 data units one by one, and generate input sequence data. Accordingly, the electronic device may generate 175 (205−30) sequence data or 181(211−30) sequence data. Meanwhile, the aforementioned sequence data is data for one facial expression of one participant. Thus, the electronic device may acquire 52500 (20×15×175) sequence data or 54300 (20×15×181) sequence data with respect to 15 facial expressions that are repeated 20 times for one participant.

Further, the electronic device may generate a learning model by inputting the acquired sequence data and data of an avatar's facial movement acquired at the same time as a facial electromyography signal into a deep learning model.

Figure 6:
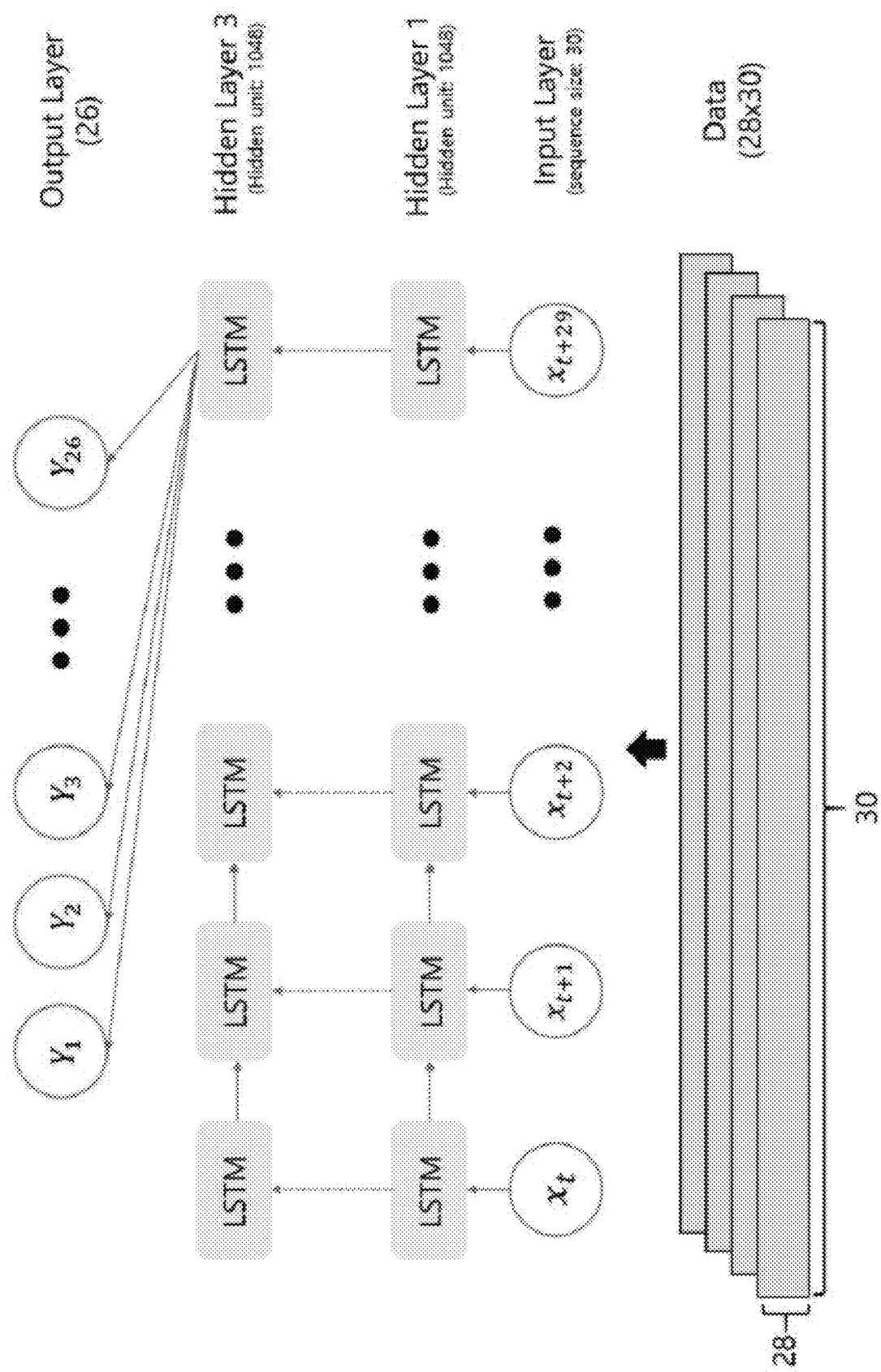
FIG. 6 is a diagram illustrating a deep learning model according to an embodiment of the disclosure.

FIG. 6 is a diagram illustrating a deep learning model according to an embodiment of the disclosure.

As an example, for identifying a relation between a facial electromyography signal generated according to a facial expression or a facial movement and an avatar's face, learning may be performed by using a residual bidirectional long short-term memory (rbLSTM) which is one of deep learning algorithms.

As illustrated in FIG. 6, an input layer of a rbLSTM model may consist of an extracted feature value, and an output layer may consist of a data value of an avatar's facial movement, and the data value of an avatar's facial movement may be estimated by using the feature value. A rbLSTM model may consist of three hidden layers, and each hidden layer may have 1,048 hidden units.

An avatar's facial expression according to a user's facial expression may be expressed based on a learning model trained through deep learning. A feature extracted from a facial electromyography signal generated according to a user's facial movement may be input as an input value of a trained deep learning model. The deep learning model may convert the input feature values into estimation values of an avatar's facial movement by using a learned parameter. Then, the electronic device may apply the converted estimation values of an avatar's facial movement and display an avatar's facial expression corresponding to the facial expression of the user.

Meanwhile, in general, facial electromyography signals may vary greatly depending on people. For example, even in the case of the same smiling expression, a facial electromyography signal of a user A and a facial electromyography signal of a user B may be expressed differently. Accordingly, in case users' facial expressions are expressed on avatars based on the same learning model, even if users A and B put on the same smiling expression, the avatars' facial expressions may be expressed differently. Therefore, the disclosure suggests a method of generating a plurality of learning models according to a feature of a facial electromyography signal, and selecting a learning model having the highest similarity to the feature of the facial electromyography signal of a user, and thereby enhancing the recognition rate of the user's facial expression.

Figure 7A:
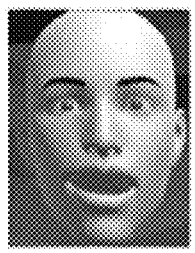
FIG. 7A is a diagram illustrating a process of selecting a learning model having high similarity to a facial electromyography signal according to an embodiment of the disclosure.
Figure 7A:
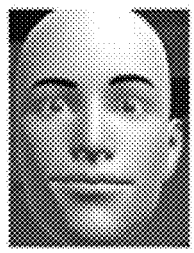
Figure 7B:
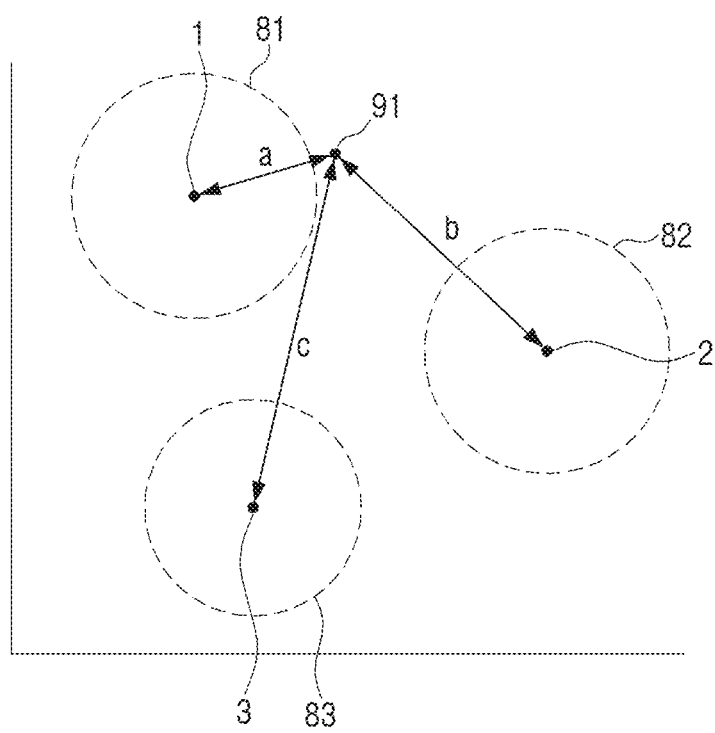
FIG. 7B is a diagram illustrating a process of selecting a learning model having high similarity to a facial electromyography signal according to an embodiment of the disclosure.

FIGS. 7A to 7C are diagrams illustrating a process of selecting a learning model having high similarity to a facial electromyography signal according to an embodiment of the disclosure.

Referring to FIG. 7A, predetermined facial expressions are illustrated. The number of predetermined facial expressions may be one, or more than one. For example, a predetermine facial expression may be at least one of an expression of 'opening the mouth and raising the left cheekbone and the left corner of lips' (a first expression) or an expression of 'raising both corners of lips and both cheekbones' (a second expression). However, predetermined facial expressions are not limited to the aforementioned examples. Meanwhile, predetermine facial expressions may be set as various facial expressions, but they may also be set as expressions moving a lot of facial muscles.

The electronic device may request a user to put on a predetermined facial expression, and extract a predetermined feature at a specific time point while the user is putting on the predetermined facial expression. For example, a specific time point may be a time point when two seconds passed after the user put on the facial expression, and the predetermined feature may be an RMS feature. However, the aforementioned specific time point and feature are just an example, and a different time point and a different feature may be set. In the learning step, predetermined facial expressions are included in various sample expressions (e.g., the aforementioned 15 facial expressions). Thus, the electronic device may extract a feature when a participant puts on a predetermined facial expression among various sample expressions. Then, in the executing step, the electronic device may request the user to put on a predetermined facial expression for selecting a learning model before the user puts on a random facial expression.

As described above, facial electromyography signals may be four channel signals, and features for each channel may be extracted. As features are extracted from each of two facial expressions, eight features in total are extracted, and the eight features may be mapped to one point in an eight dimensional space. As an example, the electronic device may group similar features as one group based on features mapped to one point in an eight dimensional space, and afterwards, the electronic device may classify the extracted features as one group among a plurality of groups based on the distance from the grouped group.

The electronic device may group similar features as one group based on a plurality of databases in the initial stage. For example, as illustrated in FIG. 7B, the electronic device may group features into first to third groups 81, 82, 83. However, the aforementioned number of groups is just an example, and the electronic device may group similar features into groups in various numbers. Also, in the learning stage, the electronic device may change the scope of each group according to accumulation of data. Then, the electronic device may learn each group separately, and generate a plurality of learning models. Accordingly, the electronic device may generate a learning model based on data of similar facial electromyography signals, and generate different learning models for data of different facial electromyography signals.

In the executing step, the electronic device may calculate the distance between a feature 91 extracted from a predetermine facial expression of a user and the center point 1 of the first group 81, the center point 2 of the second group 82, and the center point of the third group 83. Then, the electronic device may classify the extracted feature 91 as a group including the closest center point. For example, as illustrated in FIG. 7B, the extracted feature 91 is closest to the center point 1 of the first group 81, and thus the electronic device may classify the extracted feature 91 as the first group 81. Then, the electronic device may detect signals of a plurality of times from a predetermined facial expression for one user.

As illustrated in FIG. 7C, for example, the electronic device may request a predetermined facial expression 20 times to an nth user. Also, the electronic device may identify a group having high similarity for a feature extracted by using the method illustrated in FIG. 7B, for each number of times. Even in the case of the same facial expression, as the facial expression is repeated for a number of times, features may be grouped into different groups. When repetition of the facial expression for a number of times is finished, the electronic device may determine the group wherein the largest number of features are classified as the group having the highest similarity to the user. Then, the electronic device may express an avatar's facial expression corresponding to a random facial expression of the user based on a learning model corresponding to the group having the highest similarity. That is, the electronic device may determine a data value of an avatar's facial movement based on a learning model having the highest similarity to a feature corresponding to a predetermined facial expression of a user.

Figure 8:
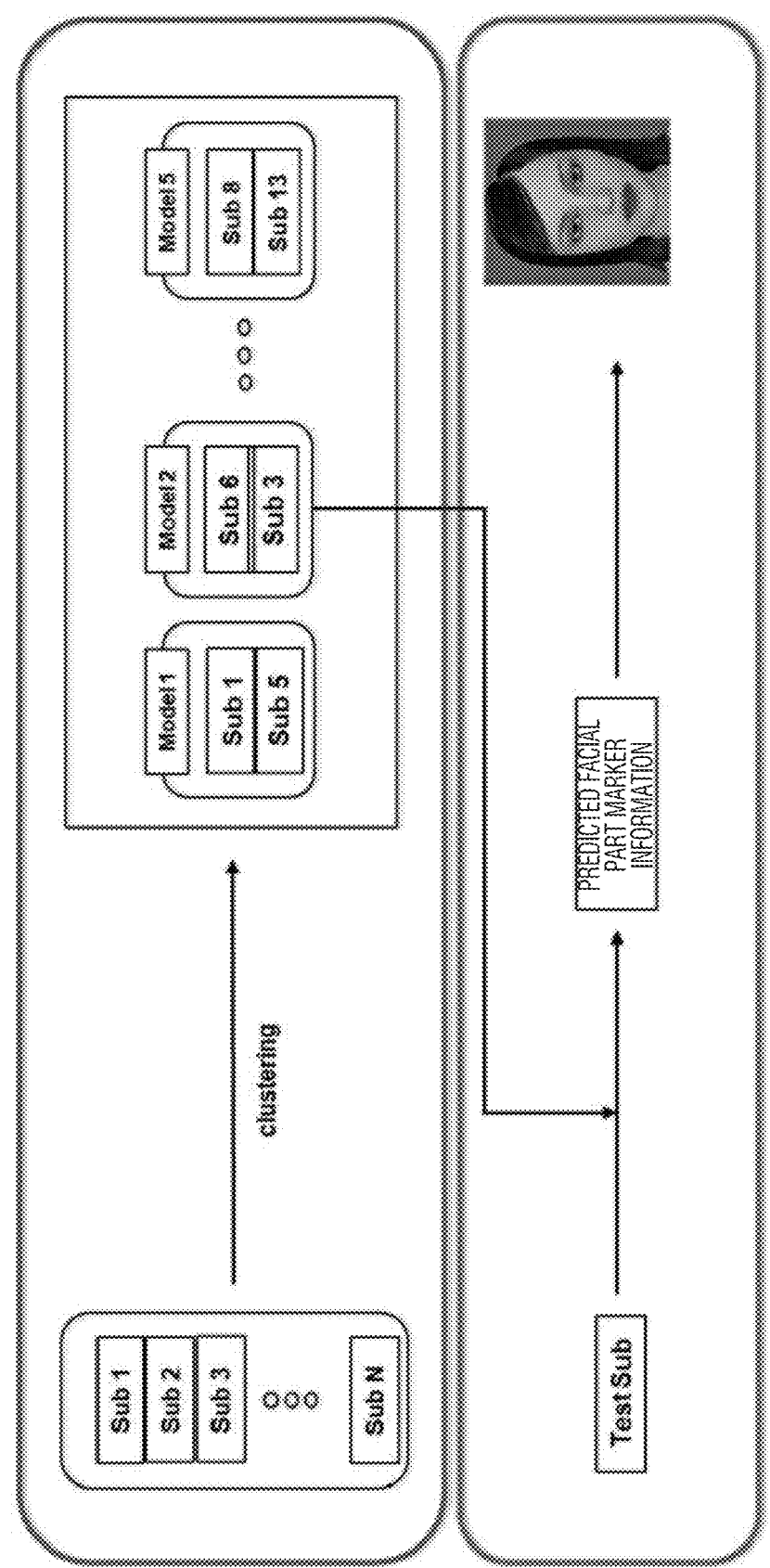
FIG. 8 is a diagram illustrating a process of restoring a facial expression based on a learning model having high similarity according to an embodiment of the disclosure.

FIG. 8 is a diagram illustrating a process of restoring a facial expression based on a learning model having high similarity according to an embodiment of the disclosure.

Referring to FIG. 8, the electronic device may classify similar facial electromyography signals as one group based on facial electromyography signals of a plurality of users. Then, the electronic device may generate a plurality of groups based on the similar facial electromyography signals. In addition, the electronic device may learn the relation between facial electromyography signals and data of the avatar's facial movement for each generated group, and generate a plurality of learning models.

In the executing step, the electronic device may request a predetermined facial expression to a user, and determine a learning model having the highest similarity to the facial electromyography signal of the user through the aforementioned process. Then, the electronic device may estimate a data value of an avatar's facial movement based on a learning model having the highest similarity determined with respect to a random facial expression of the user, and express an avatar's facial expression corresponding to the random facial expression of the user by applying the estimated data value of an avatar's facial movement.

So far, various embodiments of the electronic device expressing an avatar's facial expression corresponding to a facial electromyography signal of a user were described. Meanwhile, the electronic device expressing an avatar's facial expression may be implemented as a system, instead of a device.

Figure 9:
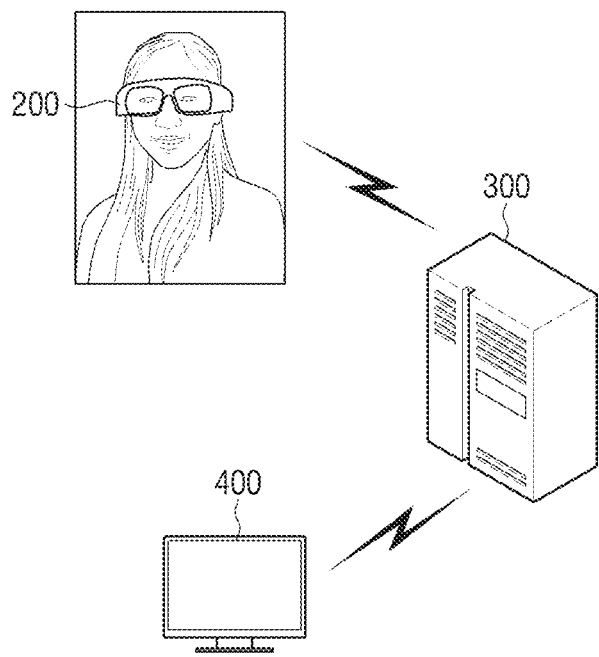
FIG. 9 is a diagram illustrating an avatar facial expression system according to an embodiment of the disclosure.

FIG. 9 is a diagram illustrating an avatar facial expression system according to an embodiment of the disclosure.

Referring to FIG. 9, an avatar facial expression system may include a sensor device 200, a server 300, and a terminal device 400. The sensor device 200 may be attached to the facial part of a user and detect a facial electromyography signal according to a facial expression. For example, the sensor device 200 may include a head-mounted display (HMD) or a glass wearable device including an area adhering to a facial part, and the like. Meanwhile, the sensor device 200 may perform the same functions and operations as the aforementioned functions and operations of the sensor part. Accordingly, the aforementioned descriptions of the sensor part may be applied to the sensor device 200 in the same manner.

The server 300 may extract a feature based on a detected facial electromyography signal, and determine a data value of an avatar's facial movement corresponding to the extracted feature. The server 300 may determine a data value of an avatar's facial movement corresponding to the extracted feature based on a learning model trained with deep learning.

Meanwhile, when determining a data value of an avatar's facial movement, the server 300 may not make determination based on one learning model, but determine a data value of an avatar's facial movement by selecting a learning model having the highest similarity to the feature of the facial electromyography signal of the user among a plurality of learning models. As an example, in the process of learning, the processor 120 may partition features corresponding to predetermined facial expression data of a plurality of users to be learned into a plurality of groups based on similarity. Meanwhile, the server 300 may perform the same functions and operations as the aforementioned functions and operations of the processor. Accordingly, the aforementioned descriptions of the processor may be applied to the server 300 in the same manner.

The terminal device 400 may control an avatar's facial movement based on a determined data value of an avatar's facial movement. That is, the terminal device 400 may display an avatar's facial expression corresponding to a facial expression of a user. For example, the terminal device 400 may include a smartphone, a laptop computer, a tablet PC, a navigation, a wearable device, a TV, a desktop computer, or a kiosk, etc. Meanwhile, the terminal device 400 may perform the same functions and operations as the aforementioned functions and operations of the display. Accordingly, the aforementioned descriptions of the display may be applied to the terminal device 400 in the same manner.

So far, an embodiment of an avatar's facial expression system was described. Hereinafter, a controlling method of an electronic device will be described.

Figure 10:
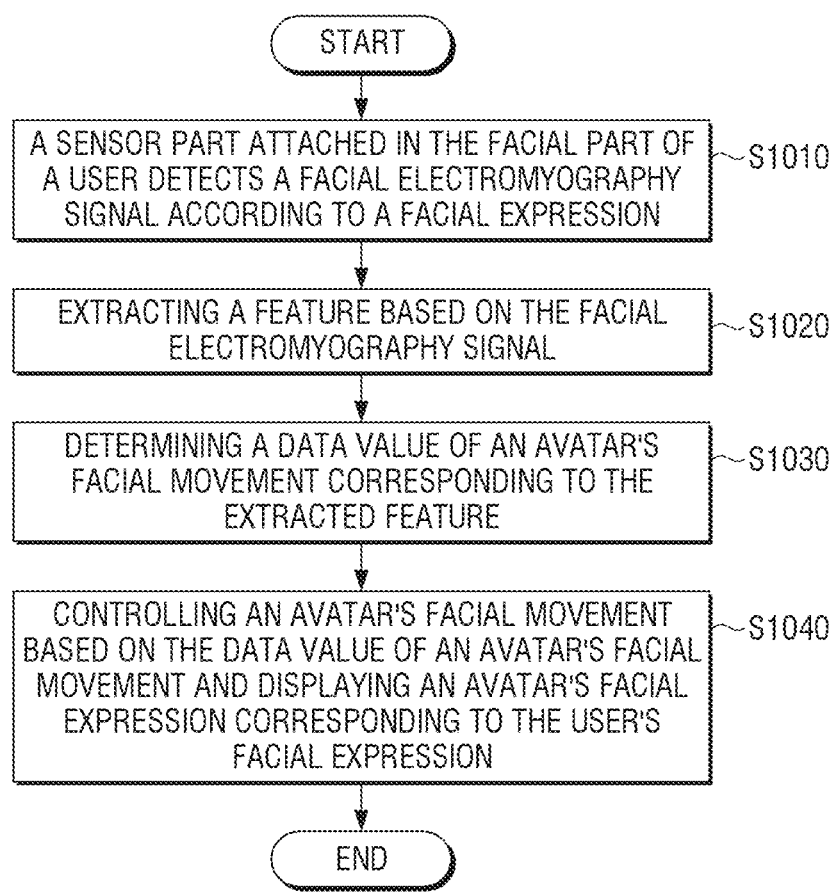
FIG. 10 is a flow chart of a controlling method of an electronic device according to an embodiment of the disclosure.

FIG. 10 is a flow chart of a controlling method of an electronic device according to an embodiment of the disclosure.

Referring to FIG. 10, in an electronic device, a sensor part attached in the facial part of a user may detect a facial electromyography signal according to a facial expression at operation S1010. For example, the sensor part may include a plurality of sensor sets including a plurality of sensor sets. Then, the electronic device may acquire a difference among a plurality of signals detected at the plurality of sensors included in each of the sensor sets as a facial electromyography signal of each of the sensor sets. Also, the electronic device may perform a process of filtering the facial electromyography signal based on a band pass filter in a band of 20 Hz to 450 Hz.

The electronic device may extract a feature based on the facial electromyography signal at operation S1020. The electronic device may extract a feature while moving a window in a predetermined size at a predetermined interval in the facial electromyography signal. For example, the feature may include at least one of a root mean square (RMS), a cepstral coefficient (CC), sample entropy (SE), or a length of a signal (WL).

Then, the electronic device may determine a data value of an avatar's facial movement corresponding to the extracted feature at operation S1030. The electronic device may partition features corresponding to predetermined facial expression data into a plurality of groups based on similarity. Then, the electronic device may determine a learning model having the highest similarity to the feature corresponding to a predetermined facial expression of a user among a plurality of learning models trained with respect to each of the plurality of partitioned groups. For example, the electronic device may calculate the distance between a center value of a group including a feature corresponding to predetermined facial expression data included in each of the plurality of learning models and a feature corresponding to the user's predetermined facial expression. Then, the electronic device may determine a learning model including a group for which the calculated distance is the closest as the learning model having the highest similarity. In addition, the electronic device may determine a data value of an avatar's facial movement based on the determined learning model.

Then, the electronic device may control the avatar's facial movement based on the data value of the avatar's facial movement and display the avatar's facial expression corresponding to the facial expression of the user at operation S1040.

The disclosure may be applied to various fields. For example, the disclosure may be applied to a field of VR social applications using avatars, a field of software/hardware platforms for recognition of facial expressions for HMDs, a field of military training using VR, a field of smart education using VR, etc.

The controlling method of an electronic device according to the aforementioned various embodiments may be provided as a computer program product. A computer program product may include a S/W program itself or a non-transitory computer readable medium storing a S/W program.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disc, a blue-ray disc, a USB, a memory card, a ROM, and the like.

Also, while preferred embodiments of the disclosure have been shown and described so far, the disclosure is not limited to the aforementioned specific embodiments, and it is apparent that various modifications can be made by those having ordinary skill in the technical field to which the disclosure belongs, without departing from the gist of the disclosure as claimed by the appended claims. In addition, it is intended that such modifications are not to be interpreted independently from the technical idea or prospect of the disclosure.

What is claimed is:

1. An electronic device comprising:
 a sensor part that is attached in the facial part of a user and detects a facial electromyography signal according to a facial expression;
 a processor that extracts a feature based on the facial electromyography signal and determines a data value of an avatar's facial movement corresponding to the extracted feature; and
 a display that controls a facial movement of the avatar based on the data value of the avatar's facial movement and displays a facial expression of the avatar corresponding to the facial expression of the user,
 wherein the processor is configured to:
 partition features corresponding to predetermined facial expression data into a plurality of groups based on similarity, and determine a data value of the avatar's facial movement based on a learning model having the highest similarity to a feature corresponding to the user's predetermined facial expression among a plurality of learning models trained with respect to each of the plurality of partitioned groups,
 wherein the processor is configured to:
 calculate a distance between a center value of a group including a feature corresponding to predetermined facial expression data included in each of the plurality of learning models and a feature corresponding to the user's predetermined facial expression, and determine a learning model including a group for which the distance is the closest as the learning model having the highest similarity.

2. The electronic device of claim 1,
 wherein, in the sensor part,
 a plurality of sensors are arranged as a sensor set in each of the upper and lower portions of the left eye of the user, and a plurality of sensors are arranged as a sensor set in each of the upper and lower portions of the right eye of the user.

3. The electronic device of claim 2,
 wherein the processor is configured to:
 acquire a difference among a plurality of signals detected at the plurality of sensors included in each of the sensor sets as a facial electromyography signal of each of the sensor sets.

4. The electronic device of claim 1,
 wherein the processor is configured to:
 filter the facial electromyography signal based on a band pass filter in a band of 20 Hz to 450 Hz.

5. The electronic device of claim 1,
 wherein the processor is configured to:
 extract the feature while moving a window in a predetermined size at a predetermined time interval in the facial electromyography signal.

6. The electronic device of claim 1,
wherein the feature includes at least one of a root mean square (RMS), a cepstral coefficient (CC), sample entropy (SE), or a length of a signal (WL).

7. A controlling method of an electronic device comprising:
detecting by a sensor part that is attached in the facial part of a user a facial electromyography signal according to a facial expression;
extracting a feature based on the facial electromyography signal;
determining a data value of an avatar's facial movement corresponding to the extracted feature; and
controlling a facial movement of the avatar based on the data value of the avatar's facial movement and displaying a facial expression of the avatar corresponding to the facial expression of the user,
wherein the determining a data value of a facial movement comprises:
partitioning features corresponding to predetermined facial expression data into a plurality of groups based on similarity, and determining a data value of the avatar's facial movement based on a learning model having the highest similarity to a feature corresponding to the user's predetermined facial expression among a plurality of learning models trained with respect to each of the plurality of partitioned groups, and
wherein the determining a data value of a facial movement comprises:
calculating a distance between a center value of a group including a feature corresponding to predetermined facial expression data included in each of the plurality of learning models and a feature corresponding to the user's predetermined facial expression, and determining a learning model including a group for which the distance is the closest as the learning model having the highest similarity.

8. The controlling method of an electronic device of claim 7,
wherein the sensor part includes a plurality of sensor sets including a plurality of sensors, and which further comprises:
acquiring a difference among a plurality of signals detected at the plurality of sensors included in each of the sensor sets as a facial electromyography signal of each of the sensor sets.

9. The controlling method of an electronic device of claim 7, further comprising
filtering the facial electromyography signal based on a band pass filter in a band of 20 Hz to 450 Hz.

10. The controlling method of an electronic device of claim 7,
wherein the extracting a feature comprises:
extracting the feature while moving a window in a predetermined size at a predetermined time interval in the facial electromyography signal.

11. The controlling method of an electronic device of claim 7,
wherein the feature includes at least one of a root mean square (RMS), a cepstral coefficient (CC), sample entropy (SE), or a length of a signal (WL).

12. An avatar facial expression system comprising:
a sensor device that is attached in the facial part of a user and detects a facial electromyography signal according to a facial expression, and transmits the detected facial electromyography signal to a server;
a server that extracts a feature based on the received facial electromyography signal, determines a data value of an avatar's facial movement corresponding to the extracted feature, and transmits the determined data value of an avatar's facial movement to a terminal device; and
a terminal device that controls a facial movement of the avatar based on the received data value of the avatar's facial movement and displays a facial expression of the avatar corresponding to the facial expression of the user,
wherein the server is configured to:
partition features corresponding to predetermined facial expression data into a plurality of groups based on similarity, and determine a data value of the avatar's facial movement based on a learning model having the highest similarity to a feature corresponding to the user's predetermined facial expression among a plurality of learning models trained with respect to each of the plurality of partitioned groups,
wherein the server is configured to:
calculate a distance between a center value of a group including a feature corresponding to predetermined facial expression data included in each of the plurality of learning models and a feature corresponding to the user's predetermined facial expression, and determine a learning model including a group for which the distance is the closest as the learning model having the highest similarity.

* * * * *